Patented Oct. 17, 1922.

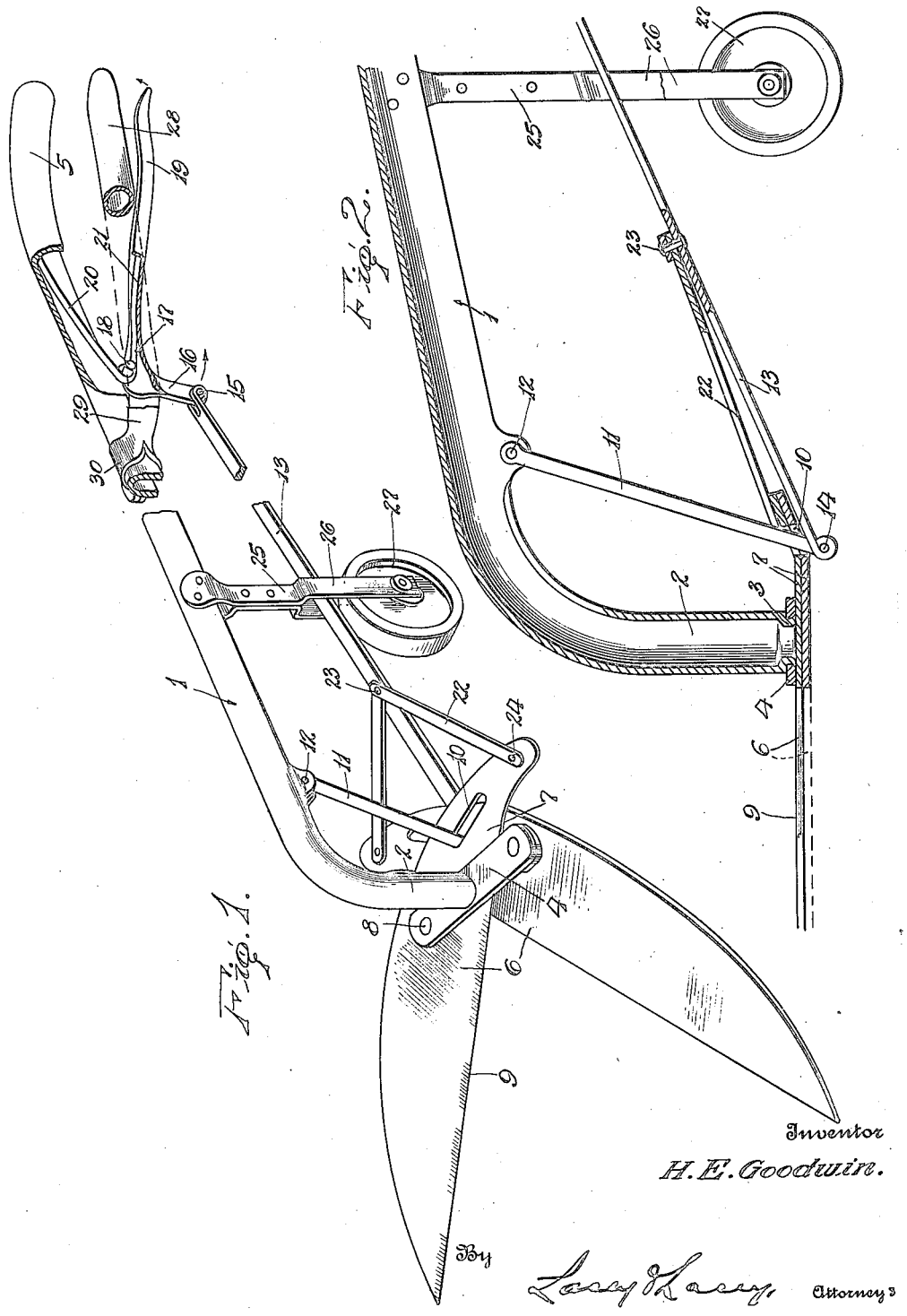

1,432,241

UNITED STATES PATENT OFFICE.

HARLEY E. GOODWIN, OF HARTFORD, CONNECTICUT.

GRASS SHEARS.

Application filed July 23, 1921. Serial No. 487,053.

*To all whom it may concern:*

Be it known that I, HARLEY E. GOODWIN, a citizen of the United States, residing at Hartford, in the county of Hartford and State of Connecticut, have invented certain new and useful Improvements in Grass Shears, of which the following is a specification.

This invention relates to improvements in shears and more particularly to that type which are employed in trimming the edges of lawns and in cutting the grass in places where it would be impracticable to employ the ordinary lawn mower.

One of the primary objects of the invention is to provide in shears embodying cooperating pivoted blades, a novel means for positively actuating the blades through the manipulation of a hand lever, means being provided for supporting the blades at the proper elevation and as the implement is moved over the lawn surface.

Another object of the invention is to so construct the shears that the same may be conveniently operated without the necessity of stooping and also without the necessity of manually supporting the shears in an elevated position as they are manipulated.

In the accompanying drawings Figure 1 is a prospective view, parts being shown in section of the shears embodying the invention.

Figure 2 is a detail vertical longitudinal sectional view through a portion of the implement.

The shears employing the invention comprises a handle which is indicated in general by the numeral 1 and which may be formed from sheet metal or may be of tubular form if preferred. The handle has its forward portion turned downwardly at an angle to provide a shank which is indicated by the numeral 2 and which has its lower end riveted or otherwise secured as at 3 to a crosshead 4 which extends transversely of the lower or forward end of the handle member. The opposite end of the handle member is provided with a grip indicated by the numeral 5 by which it may be grasped in the use of the implement. The implement further comprises a pair of blades which are indicated by the numeral 6 and each of which includes a shank portion 7 mounted by means of a pivot pin 8 upon the under side of the crosshead 4 at the end of the latter, the blades are thus so supported that their shank portions 7 will extend rearwardly of the crosshead 4 and their active portions will extend forwardly beyond the crosshead, these latter portions being provided with coacting shearing or cutting edges 9. At this point it will be evident that by acting upon the shank portions 7 of the blades, the blades may be swung about their pivots so as to effect coaction of their shearing edges 9, and with this end in view the shank portions 7 of the blades are formed with slots 10 which extend generally longitudinally of the said portions and which intersect, the shank portions of the blades assuming an overlapped position as clearly illustrated in the drawings. An arm 11 is pivotally suspended at its upper end as at 12 from the handle number 1 and at its lower end works in the slots 10, backward and forward swinging movement of this arm 11 serving to impart to the blades a swinging movement upon their pivots so as to cause coaction of their cutting edges.

In order that the arm 11 may be swung backward and forward for the purpose stated a bar or rod 13 is pivotally connected at its forward end at the lower end of the said arm and the rear end of the bar 13 is pivoted as at 15 to one arm 16 of an angle lever indicated in general by the numeral 17, this angle lever being pivotally supported as at 18 upon the under side of the handle number 1, beneath the grip 5, the other arm of the lever indicated by the numeral 19, being so formed as to adapt it to be conveniently manipulated by the hand which grasps the grip 5 so that reciprocatory motion may be imparted to the bar 13 and swinging motion to the arm 11, as previously stated. In order that the parts may be normally held in such position that the blades 6 will be relatively separated, and in order that the parts may be automatically returned to this position after each manipulation of the hand lever 17 to close the blades, a spring 20 is coiled about the pivot 18 and has diverging portions 21 which bear between the grip 5 of the handle 1 and the grip 19 of the hand lever 17.

It will be evident from the foregoing that as the arm 11 is swung rearwardly it will ride in the slots 10 in a manner to swing the blades 6 upon their respective pivots to cause coaction of their cutting edges, but in order that this movement may be effected in a more steady and positive manner, links 22 are pivotally connected at their rear ends as at 23 to the bar 13 and their forward ends as at 24 to the rear ends of the blade shanks 7. Thus as the bar 13 is reciprocated through manipulation of the hand lever 17, not only will the arm 11 be swung upon its pivot to actuate the blades 6, but also the links 22 will be actuated to in turn actuate the blades.

In order that the implement may be conveniently moved over the lawn surface and in order that the blades may be supported at the proper elevation without tiring the user of the implement by requiring him to manually support the implement while it is being manipulated a bracket 25 is fixed upon the handle member 1 and extends downwardly from the same and comprises a yoke portion 26 which straddles the bar 13 and in the lower portion of which there is mounted a ground wheel 27, the lower side of the wheel being located a sufficient distance below the plane occupied by the blades 6 to support these blades at the desired elevation when the ground wheel is resting upon the lawn surface.

From the foregoing description of the invention it will be seen that there is provided an implement which may be conveniently employed in trimming the edges of a lawn and in trimming grass in other places where it is not practicable to make use of an ordinary lawn mower. It will also be evident that the implement may be operated without tiring the user inasmuch as it is not required that the implement be manually supported while in use.

In order that the shears may be steadied and more conveniently manipulated, it is preferable that an auxiliary handle 28 be provided. This hande is laterally turned at its forward portion as at 29 and provided with a split clamping collar 30 which is fitted to and clamped about the handle 1 in advance of the grip 5 thereof. Ordinarily the handle 28 will be so clamped to the handle 1 that it will lie at the left hand side thereof so as to be in position to be grasped by the left hand of the operator of the shears but if desired it may be swung about the handle 1 to lie at the opposite or right hand side thereof by loosening the clamp collar 30.

Having thus described the invention, what is claimed as new is:

1. In shears of the class described a handle member, a cross piece carried thereby, blades pivoted upon the cross piece, the said blades having intersecting slots, an arm pivotally mounted upon the said handle and operating in the said slots, a hand lever mounted upon the handle, and operative section between the said arm and the hand lever.

2. In shears of the class described, a handle member, a cross piece carried thereby, blades pivoted upon the cross piece, the said blades having overlapping shank portions provided with intersecting slots, an arm pivotally mounted upon the said handle and operating in said slots, a hand lever mounted upon the handle, operative connection between the said arm and the hand lever, and operative connection between the first mentioned connection and the shank portions of the blades.

3. In shears of the class described, a handle member, a crosshead rigidly supported by the handle, blades pivotally mounted upon the crosshead, at opposite sides of the handle and having overlapping shank portions provided with intersecting slots, an arm pivotally mounted upon the handle, a connecting bar extending between the hand lever and the said arm, and operative connection between the shank portions of the blades and the said bar.

4. In shears of the class described, a handle member, blades supported thereby for coactive movement, means supported by the handle member and operatively connected with the blades and operable to actuate the same, and a supplemental handle adjustably mounted upon the first mentioned handle and adapted to occupy a position at one side or the other thereof.

In testimony whereof I affix my signature.

HARLEY E. GOODWIN. [L. S.]